(12) United States Patent
Dhanabalan (10) Patent No.: US 10,153,964 B2
(45) Date of Patent: Dec. 11, 2018

(54) NETWORK ROUTING USING DYNAMIC VIRTUAL PATHS IN AN OVERLAY NETWORK

(71) Applicant: Citrix Systems, Inc., Fort Lauderdale, FL (US)

(72) Inventor: Praveen R. Dhanabalan, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 121 days.

(21) Appl. No.: 15/259,285

(22) Filed: Sep. 8, 2016

(65) Prior Publication Data

US 2018/0069780 A1    Mar. 8, 2018

(51) Int. Cl.
*H04L 12/26* (2006.01)
*H04L 12/713* (2013.01)
*H04L 12/715* (2013.01)
*H04L 12/721* (2013.01)
*H04L 12/913* (2013.01)

(52) U.S. Cl.
CPC ............ *H04L 45/124* (2013.01); *H04L 43/08* (2013.01); *H04L 45/586* (2013.01); *H04L 45/64* (2013.01); *H04L 47/724* (2013.01)

(58) Field of Classification Search
CPC ..... H04L 43/08–43/0894; H04L 45/02–45/04; H04L 45/12–45/1287; H04L 45/586; H04L 45/64; H04L 47/70–47/829; H04L 49/70; H04W 40/02–40/34
See application file for complete search history.

(56) References Cited

U.S. PATENT DOCUMENTS

| 7,643,426 B1 * | 1/2010 | Lee | H04L 45/02 370/238 |
| 9,450,817 B1 * | 9/2016 | Bahadur | H04L 45/64 709/221 |

* cited by examiner

*Primary Examiner* — Timothy J Weidner
(74) *Attorney, Agent, or Firm* — Fox Rothschild LLP; Robert J. Sacco; Carol E. Thorstad-Forsyth (57) ABSTRACT

A computer networking appliance includes a networking device to route data through an overlay network. The networking device is connected to a first computer network and receives a data packet to be communicated to a destination computing device. The networking device analyzes the packet to determine a minimum bandwidth requirement corresponding to the data packet, and the destination computing device connected to a second computer network. The networking device then dynamically identifies a plurality of paths to the destination computing device, uses the minimum bandwidth requirement to obtain path information for each of the plurality of paths, and chooses an optimal path to the destination computing device from among the plurality of paths based on a plurality of path metrics associated with each of the plurality of paths.

30 Claims, 6 Drawing Sheets

NETWORK ROUTING USING DYNAMIC VIRTUAL PATHS IN AN OVERLAY NETWORK

BACKGROUND

Statement of the Technical Field

The present disclosure relates to computer networks. More particularly, the present disclosure relates to implementing systems and methods for routing information over an overlay network such as a virtual Wide Area Network ("WAN") network.

Description of the Related Art

The related art concerns methods and systems for routing data through computer networks. Large organizations, such as enterprises, are often geographically spread out over many separate locations, referred to as branches. For example, an enterprise may have branches in Florida, California, and India. Each branch location may include its own internal Local Area Network ("LAN") for exchanging data within the branch. Additionally, the branches may be connected via a WAN (e.g., the internet) for exchanging data between branches. However, enterprises struggle with improving the reliability and capacity of their WANs. While the capacity of network connections has increased since the introduction of dial up, high speed connectivity is not ubiquitous in all regions. Also, bandwidth is not an unlimited resource and there is a need for solutions that improve the bandwidth utilization and also that address network performance issues.

MultiProtocol Label Switching ("MPLS") between branches is reliable and provides fairly consistent performance, but adding capacity can be expensive. Internet connections via broadband technologies such as cable and Digital Subscriber Line ("DSL") are much less costly, but reliability and performance are inconsistent. To address some of these issues, enterprises may employ WAN virtualization between multi-site networks to introduce bandwidth from multiple unique sources at each location. WAN Virtualization allows two or more sites to communicate over multiple diverse WAN links as if directly connected with a high-capacity point-to-point connection. WAN virtualization includes inserting an intelligent layer between the physical WAN resources (DSL, Cable, T1, MultiProtocol Label Switching ("MPLS"), etc.) which constantly monitors all links available, and makes routing, re-routing, load balancing decisions accordingly. It also segregates the traffic to different Quality of Service ("QoS") classes, and QoS policy is a factor that influences the path selection for a specific traffic. Hence, with WAN virtualization, quality QoS rules, path selection and traffic shaping can be applied to ensure that high-priority applications always perform well. WAN virtualization can also ensure that all bandwidth on all paths is fully utilized, and provides faster connectivity. In addition, critical business processes can be protected against network outages.

In a virtual WAN, a virtual path facilitates flow of data between a source and destination node, and may traverse one or more intermediate nodes. Each time the data packet communicates from one such node to the next node, it is referred to as a "hop". Each node in a virtual WAN may communicate with a neighboring node via one or more WAN links (DSL, Cable, T1, MPLS etc.). A node in a virtual WAN may be physical device (such as switches, hubs, routers, middleboxes, WAN optimizers, etc.) or a virtual appliance. The nodes have ports for receiving incoming data packets and transmitting outgoing data packets, and have corresponding application intelligence for their operation. Nodes may enforce application specific policy based functions such as QoS control, resource management, packet filtering, Virtual Private Network ("VPN") tunneling, intrusion detection, security and so forth.

Typically, virtual paths between a source and destination node (such as computing devices in two office branches) are statically defined when the virtual WAN is initially configured. The statically pre-defined paths may include one or more intermediate nodes. A WAN virtualization device at the source node monitors detailed characteristics of each statically pre-configured virtual path to a destination node (for various parameters like packet loss, latency, jitter, etc.), and routes packets of a data transmission across the statically pre-configured virtual paths on a packet by packet basis instead of a per-transmission basis. However, a source node does not identify or consider other possible paths for forwarding traffic in a virtual WAN network. Hence, conventional routing protocols in a virtual WAN are oblivious to other more efficient/faster virtual paths (other than those initially configured) that may connect a source node to a destination node.

SUMMARY

Embodiments concern a method and system for routing packet data through an overlay network based on application needs and network conditions. A computer networking device connected to a first computer network receives a data packet to be communicated to a destination computing device. The computer networking analyzes the data packet to determine a minimum bandwidth requirement corresponding to the data packet, and the destination computing device connected to a second computer network. The computer networking device then dynamically identifies a plurality of paths between the computer networking device and the destination computing device, wherein each of the plurality of paths traverse one or more peer nodes. It also uses the minimum bandwidth requirement to obtain path information for each of the plurality of paths. The path information may include a plurality of path metrics specifying dynamic characteristics for each of the plurality of paths. Exemplary path metrics can include data latency associated with the particular path, lease time associated with the particular path, and link quality associated with the particular path. The computer networking device, chooses an optimal path to the destination computing device from among the plurality of paths based on the plurality of path metrics associated with each of the plurality of paths. In the foregoing embodiment, the computer networking device and a plurality of peer nodes comprise the second computer network which is an overlay upon the first computer network. Further, the plurality of paths traverse paths that include network nodes other than the plurality of peer nodes.

In an embodiment, using the minimum bandwidth requirement to obtain path information includes sending a reservation message to a peer node adjacent to the first computer networking device in each of the plurality of paths. The reservation message includes information relating to the minimum bandwidth requirement and subsequent peer nodes in that path. The reservation message also includes instructions for each peer node in that path to, upon receipt of a reservation message, perform the following: determine whether that peer node can fulfill the minimum bandwidth requirement, and if that peer node cannot fulfill the minimum bandwidth requirement, send a request denial message to the computer networking device. If that peer node can fulfill the minimum bandwidth requirement, it is instructed to update the reservation message and determine whether it is the destination computing device. The updated reservation message can include information such as a lease time associated with that peer node, a latency associated with a link between that peer node and a peer node from which the reservation message was received, and a link quality associated with the link. Furthermore, if that peer node determines that it is the destination computing device, it is instructed to send a confirmation message to the first computer networking device; else if the peer node is not the destination computing device, it is instructed to forward the updated reservation message to a next peer node in the path. The confirmation message comprises the updated reservation message. The reservation message may also include instructions for each peer node in the path to, if that peer node can fulfill the minimum bandwidth requirement: identify an optimal link, of a plurality of links, between that peer node and a peer node from which the reservation message was received based on one or more link characteristics associated with each of the plurality of links, the one or more link characteristics selected from the group consisting of the available bandwidth, data latency, data loss characteristics, and jitter. In an embodiment, information concerning the link characteristics for each of the plurality of links may be determined based on data traffic communicated between that peer node and the peer node from which the reservation message was received.

In an embodiment, upon receipt of a request denial message from a node in a path corresponding to that path, the computer networking device discards the path, and stores the route information for the discarded path which may include the plurality of route metrics for the discarded path. Alternatively and/or additionally, upon receipt of a confirmation message from a node in a path corresponding to that path, the computer networking device uses information included in the confirmation message to determine the plurality of path metrics for the path. The plurality of path metrics are determined based on, for example, a data latency associated with the path, the data latency being a sum of a plurality of data latencies associated with a plurality of links in the path, a lease time associated with the path, the lease time corresponding to a minimum lease times of a plurality lease times associated with the plurality of links in the path, or link quality associated with the particular path, the link quality corresponding to a minimum link quality of a plurality link qualities associated with the plurality of links in the path.

The method also includes selectively varying levels of significance or weight accorded to each of the plurality of path metrics based on the type of data contained in the data packet for purposes of choosing the optimal path to the destination computing device. The type of data packet can imply a type of application which communicated said data packet, and the optimal path can be chosen to facilitate optimal performance of the type of application which is implied. More particularly, optimal performance can be obtained by more heavily weighting the importance of one or more attributes from among the plurality of path metrics for purposes of selecting the optimal path to the destination computing device from among the plurality of paths.

With the arrangements as described herein, an optimal path which is chosen for a subsequently received second data packet can be different, even though such packet may be of the same type as the previous data packet. The optimal path is varied when a change occurs in one or more of the plurality of paths with respect to one or more of the path metrics which are predetermined to be of importance for communicating the type of data.

BRIEF DESCRIPTION OF THE DRAWINGS

The present solution will be described with reference to the following drawing figures, in which like numerals represent like items throughout the figures.

DETAILED DESCRIPTION

It will be readily understood that the components of the present solution as generally described herein and illustrated in the appended figures could be arranged and designed in a wide variety of different configurations. Thus, the following more detailed description of various implementations of the present solution, as represented in the figures, is not intended to limit the scope of the present disclosure, but is merely representative of various implementations. While the various aspects of the present solution are presented in drawings, the drawings are not necessarily drawn to scale unless specifically indicated.

As used herein, a "computing device" or "processing device" refers to an electronic device or group of multiple electronic devices that processes data in order to perform one or more functions. A computing device or processing device may be a component of any processor-based device such as, for example, a server, a set of networked servers, a personal computer, a personal digital assistant, a web-enabled phone, a smart terminal, a dumb terminal and/or other electronic device or devices capable of communicating in a networked environment. A computing device or processing device will be able to interpret and execute programming instructions.

"Overlay networks" are virtual networks of nodes and logical links that are implemented over ("on top of") existing networks (such as the Internet) in order to provide network services that may not be available in the existing networks. Routing functions of an overlay network differ from those of the underlying network and communications (e.g., packets) may be exchanged in an overlay network between subnetworks or "sites" within the overlay network. A virtual WAN (created by WAN virtualization) is a type of an overlay network over an underlying network that connects multiple branches such as a client site and a server site.

A "node" refers to a connection point in a network, which may be a source point, a redistribution point, or an end point for data transmissions, that intelligently forward data packets in a network(s). Examples of nodes may include, without limitation, network routing devices such as routers, firewalls, middleboxes, swtiches, hubs, bridges, etc., or a combination thereof. A node in a virtual WAN (hereinafter referred to as a "middlebox node" or a "middlebox") may be physical device or a virtual appliance which manipulates data traffic in ways that are normally associated with a network routing device. A node may include and/or may be in communication with a processor and a non-transitory, computer-readable medium (i.e., memory). The memory may contain programming instructions in the form of a software application that, when executed by the processor, causes the node to perform one or more processing operations according to the programming instructions.

A "virtual path" or a "path" refers to a path that a data packet traverses between a source node and a destination node in an overlay network.

A "link" refers to a communication protocol for transmitting information between two adjacent nodes of an overlay network. Examples may include, without limitation, different types of broadband links (such as Cable, DSL, fiber-optic, etc.), wireless links, MPLS, or the like. There may be one or more links available between two adjacent nodes.

The present solution disclosed herein may provide certain advantages in a communication network, such as overlay networks. The present solution improves the performance of such networks by dynamically identifying virtual paths across a plurality of middlebox nodes which form an overlay network on an existing network. These routing functions are performed for the purpose of facilitating certain enhanced network routing protocols as described herein.

Figure 1:
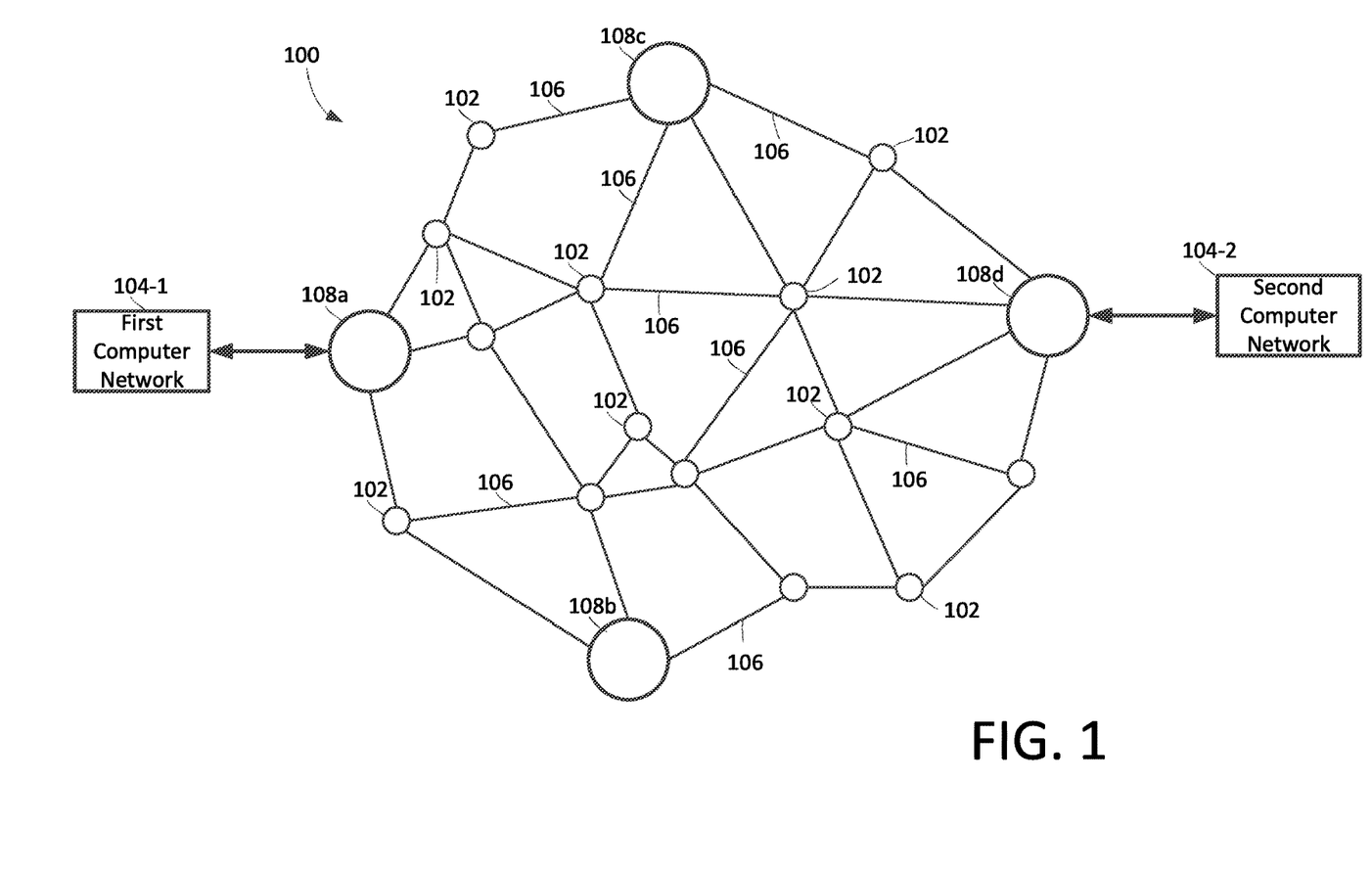
FIG. 1 is an exemplary diagram of a computer data communication network showing certain nodes comprising an overlay network.

Referring now to FIG. 1, it can be observed that a packet data network 100 (such as the Internet) can comprise a plurality of network nodes 102 which are capable of receiving and routing data packets. As such, the network nodes 102 can be generally understood to include conventional network routers capable of routing data packet traffic through the data network. The data packets are routed through various communication paths 106 defined between adjacent nodes 102 from a first computer network 104-1 to a second computer network 104-2. Within such a network there is advantageously provided an overlay network (such as virtual WAN) which is comprised of a plurality of middleboxes 108a, 108b, 108c and 108d. These middleboxes 108a, 108b, 108c, and 108d can perform a variety of functions, including manipulation of network traffic for routing purposes as described herein. For example, the middleboxes 108a, 108b, 108c, 108d can perform routing functions similar to the routing functions performed at one or more network nodes 102, but can offer advanced routing features for certain data traffic communications between first computer network 104-1 and second computer network 104-2. These advanced routing functions will become more apparent as the discussion progresses.

Figure 2:
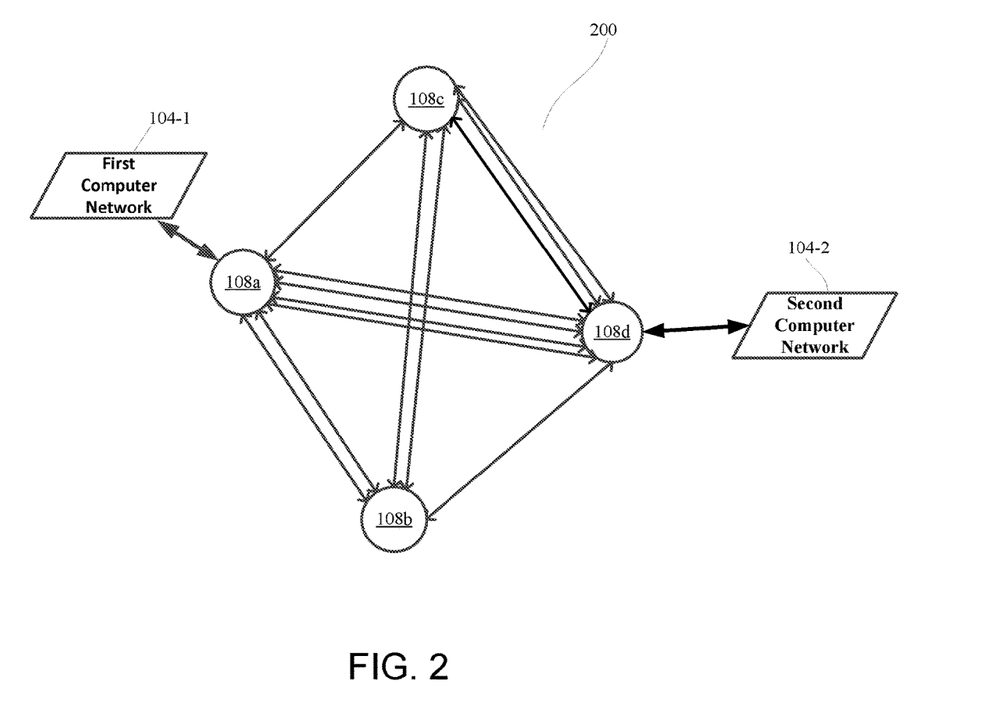
FIG. 2 exclusively shows those nodes which comprise the overlay network in FIG. 1.

An exemplary overlay network 200 is shown in FIG. 2. The overlay network 200 shown is based on the exemplary network 100 in FIG. 1 but is shown without the plurality of network nodes 102. This is a drawing simplification to facilitate greater clarity and understanding of the present solution. However, it should be understood that the communications among the middleboxes 108a, 108b, 108c, and 108d as described herein will generally include communication paths that may transition through one or more of such network nodes 102 as shown in FIG. 1.

As the overlay network of middleboxes grows, it becomes possible to establish routing protocols that allow such middleboxes to find the optimal virtual path through the network 100 for meeting the requirements of a particular software application or service executing on machines associated with computer network 104-1 and 104-2. While only four middleboxes 108a, 108b, 108c and 108d are shown in this exemplary overlay network, it should be appreciated that an actual network could have hundreds or thousands of such middleboxes distributed throughout a large scale network such as the Internet. As shown in FIG. 2, there may be one or more links between middleboxes 108a, 108b, 108c and 108d. For example, in the example overlay network 200, there are two links between 108a and 108b, one link between 108a and 108c, four links between 108a and 108d, two links between 108b and 108c, one link between 108b and 108d, and three links between 108c and 108d. The links are bidirectional, i.e., they allow flow of information and data in both directions. The dynamic identification of virtual paths and the selection of the optimal virtual path can be based on a plurality of link characteristics as between adjacent middleboxes, and overall path metrics. These link characteristics and path metrics are advantageously selected so that they are useful for assessing the suitability of different virtual paths for communicating data between machines associated with computer network 104-1 and 104-2. Exemplary link characteristics and path metrics that can be evaluated for this purpose can include information concerning available bandwidth, latency, packet loss and jitter associated with a particular link as well as an overall path (which may include one or more links).

As discussed above, in a virtual WAN type of overlay network, the virtual paths between a source and a destination node are statically pre-configured at the time of configuration of the virtual WAN (for e.g., by a network administrator). A conventional middlebox provides packet routing usually following one of two basic paradigms: routing based on a destination Internet Protocol ("IP") address using information in a single IP routing table (that designates the next hop for each data packet, a list of nodes that may be called upon to forward the packet, and a set of rules and routing protocols that govern how the packet is forwarded); or routing based on following an explicit pre-configured path through the network. Specifically, a conventional middlebox may only select appropriate links between nodes of the pre-configured virtual paths for forwarding data packets. For example, a middlebox may select the link based on link characteristics such as available bandwidth, latency, packet loss and jitter. While pre-configured static routes require less processing, changes to virtual WAN topology cannot be addressed quickly. Statically configured virtual paths may also lead to loss of efficiency, under-utilization of bandwidth, loss of packets, etc. because more efficient virtual paths may become available that may be ignored. Hence, this type of static routing does not always guarantee network quality through the network, and will result in sub-optimum network paths for various types of data traffic between software applications at the source and destination nodes.

Figure 3:
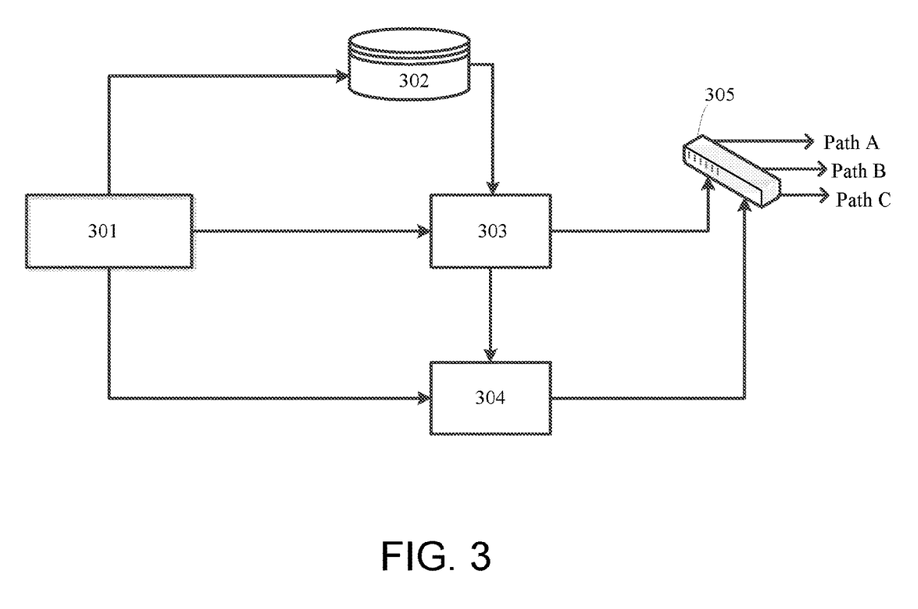
FIG. 3 is a block diagram illustrating an exemplary middlebox architecture.

Accordingly, in the present solution disclosed herein, the middleboxes 108a, 108b, 108c, and 108d in FIGS. 1 and 2 will function as routing devices in an overlay network. FIG. 3 illustrates a block diagram of an example architecture of a middlebox. As will be appreciated by one skilled in the art, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present solution may take the form of a computer program product embodied in one or more computer readable medium(s) having computer readable program code embodied thereon. The provisioning of the system functionality may be divided between one or more servers in one or more locations and/or various end-user devices such as, without limitation, a router, a switch, or the like. It should be understood that while a middlebox of the current disclosure will operate in accordance with the principles discussed in this disclosure to identify dynamic virtual paths in an overlay network, it may also include capabilities of a conventional networking device and can use/implement now or hereafter known routing protocols. For example, a middelbox may maintain routing sessions for the Border Gateway Protocol ("BGP"), the Label Distribution Protocol ("LDP"), the Intermediate System to Intermediate System ("ISIS") protocol, the Open Shortest Path First ("OSPF") protocol, the Routing Information Protocol ("RIP") or other routing protocols.

As shown in FIG. 3, a middlebox 300 may include an architecture, supported by software and hardware systems (described below with respect to FIG. 6) that can include centralized computer-based and communications-based hardware systems or a distributed network of such systems. In some scenarios, a middlebox may include a packet processing engine 301, a link quality estimator 303, a path manipulator 304, and a path switcher 305, communicatively coupled to one another, one or more processing devices, and/or a memory 302.

In some scenarios, the packet processing engine 301 may be configured to receive input packets from a source node and/or an intermediate node at one or more input interfaces coupled to one or more communication networks. The packet processing engine 301 may further be configured to analyze a received packet and extract information such as, packet payload and packet header. The packet header may include packet forwarding constraints such as QoS parameters, access control rules, destination and source IP addresses, destination and source IP ports, information relating to the data transmission, or the like. A packet payload may include information relating to packet contents, bandwidth requirement, or the like.

The path manipulator 304 is configured to determine an optimal packet forwarding path based on information received from the, packet processing engine 301 (provides packet information), the link quality estimator 303, and routing information in the memory. The path manipulator 304 may perform route lookups and may dynamically determine an optimal based on the received information (as discussed below with respect to FIG. 4). The path manipulator 304 may provide the optimal path information to a path switcher 305, which in turn may forward the packet along the optimal virtual path.

The memory 302 may be responsible for receiving and maintaining routing information that describes a topology of an overlay network and/or the underlying network and, in particular, routes through the networks. The routing information may include, for example, route data that describes various routes within the networks, and corresponding next hop data indicating appropriate nodes within the network for each of the routes. A middlebox may periodically update its corresponding routing information to accurately reflect the network topology. The middlebox may update the information using now or hereafter known methods such as by using routing advertisement messages, update messages, reachability protocols, or the like. The memory 302 may store the network topology and routing information using now or hereafter known formats such as routing tables, forwarding tables, or the like.

The link quality estimator 303 may determine link characteristics including the quality of the links between the middlebox 300 and one or more neighboring nodes. The link quality estimator may be configured to determine the quality of a link using one or more parameters or attributes such as packet loss, jitter, or the like. The link quality estimator 303 may also determine link characteristics relating to latency in the links between the middlebox 300 and one or more neighboring nodes. The link quality estimator 303 may also determine link characteristics relating to available bandwidth in the links between the middlebox 300 and one or more neighboring nodes. Of course, the present solution is not limited in this regard and other types of link characteristics can also be determined.

Each middlebox can be responsible for evaluating the quality of links to adjacent middlebox nodes in the overlay network. For example, referring to FIG. 2, middlebox node 108c can be responsible to determine dynamic link characteristics (bandwidth, latency, packet loss and jitter) as between itself and each of nodes 108a, 108b, and 108d. Similarly, middlebox node 108a would be responsible for determining the dynamic link characteristics between itself and each of nodes 108b and 108c. Each middlebox could then share this information with other nodes in the network using routing update messages and/or advertising messages. The information can be gathered by each node using any suitable technique. In some scenarios, a middlebox can encapsulate actual data traffic using a packet header for this purpose. In other scenarios, the middlebox can generate synthetic or test data for purposes of determining dynamic link metrics of a particular routing path and/or overall path metrics. Other methods are within the scope of this disclosure. In a scenario, the link quality estimator may periodically update the determined link characteristics for a link.

Various techniques can be applied to gather the information pertaining to link characteristics. For example, the link quality estimator may determine the link characteristics based on actual traffic traversing a link where the link quality estimator collects information (such as time stamp, packet counter, loss ratio, etc.) regarding packets sent by the middlebox and received by the neighboring nodes, and analyzes the information to determine the link quality and/or latency. Bandwidth is the bit rate achieved by each of the ports in the appliance. It is either the capacity of the port or the network threshold that is dictated by the Network provider (ISP). Latency can be measured from the data packets. For encapsulated packets, the packets could be time-stamped and hence from the sending time and the receiving timestamp on the encapsulated packet the latency (one-way latency) can be computed. For raw packets (which are synthetically generated) the time difference between the sent packet and the acknowledge packet will help determine the two-way latency (round-trip time). Packet jitter concerns the transmission time variations between the various packets received on the same connection. If the variation is high, then the packet jitter is high (indicating a poor connection). This jitter information can be computed from the various connections through the appliance. Packet loss information pertains to the average packet loss that happened between two nodes within a period of time. Thus, packet loss can be determined by the failure to receive a proper acknowledgement (ACK) message at the sending node for one or more transmitted packets. When the ACK message is not received at the sending node, then the packet is assumed lost. The appliance can keep track of this information and determine over time how much loss is experienced when using a particular path through the network. As discussed above, this information can be shared or communicated with other nodes in the network and updated information can be communicated to other nodes as necessary.

In some scenarios, the link quality estimator 303 may also determine an overall path metrics of a virtual path between the middlebox and a destination node. The middlebox 300 can use the link characteristics and/or overall path metrics to advantageously choose an optimum path for each data packet routed between middleboxes. Further, the optimum path can be selected in accordance with the needs of a particular application that generated such data packets. The link characteristics and/or overall path metrics may be associated with the network topology and stored in a database such as in a routing table.

Figure 4:
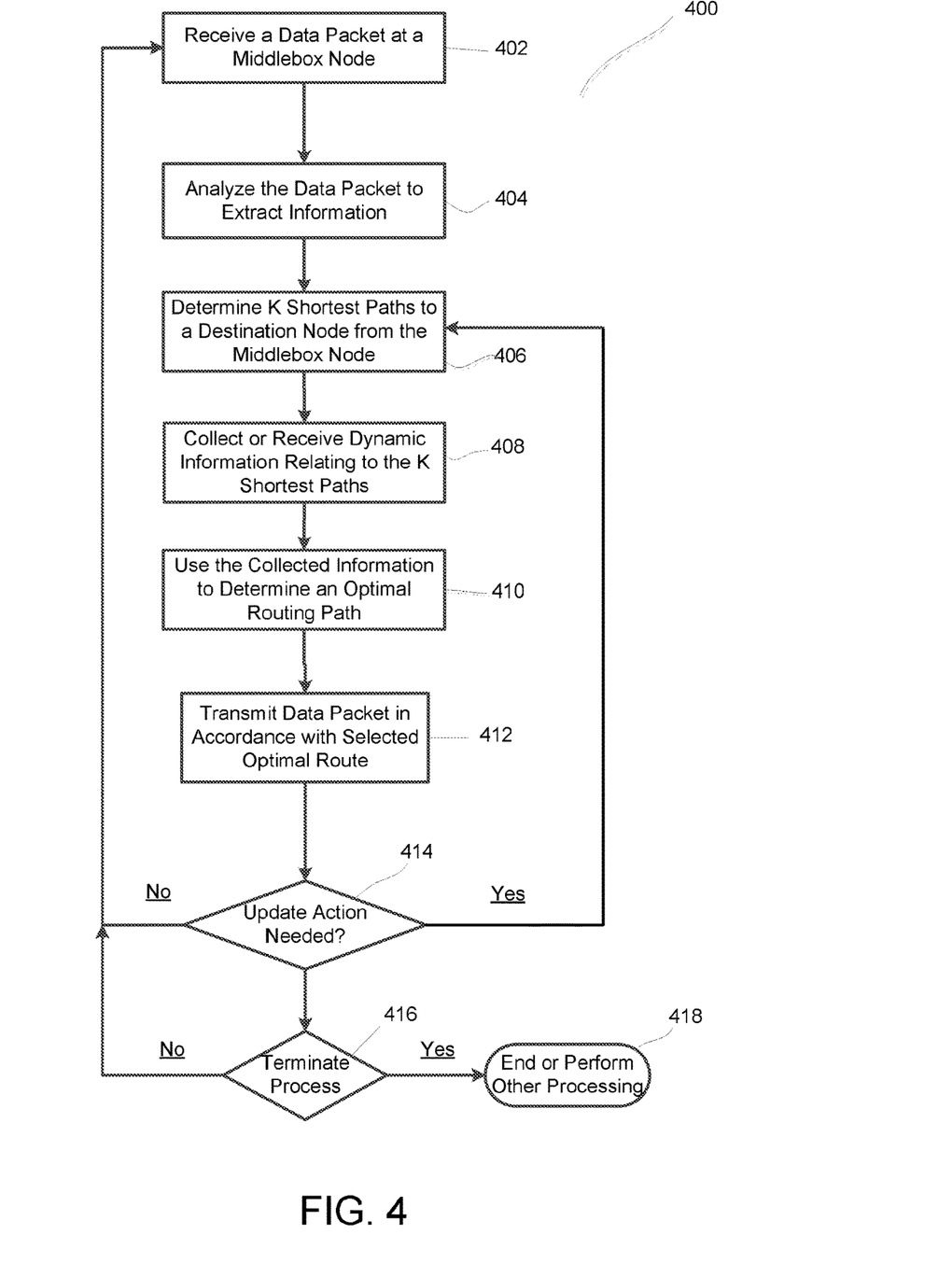
FIG. 4 is a flowchart illustrating an example method for identifying dynamic virtual paths in an overlay network and selecting an optimal path for forwarding a data packet.

Referring now to FIG. 4, there is shown a flowchart of a method 400 which is useful for understanding the manner in which dynamic virtual paths are identified and an optimal path is selected for data packets received at each middlebox node in an overlay network (e.g., overlay network 200 of FIG. 2). Method 400 begins at 402 where a middlebox node (e.g., middlebox 108a, 108b, 108c, or 108d of FIG. 1) receives a data packet to be forwarded in the overlay network.

At 404, the middlebox node analyzes the data packet to extract various information therefrom. The extracted information can include, but is not limited to, source information, destination information, and/or forwarding constraints (such as required QoS, bandwidth requirements, or the like). The middlebox node may also analyze an incoming packet to determine the type of application which originated the packet and/or the type of data (e.g., video data, Voice Over IP ("VOIP") data, File Transfer Protocol ("FTP") data, and/or data supporting a virtual desktop session) which is being communicated.

Deep Packet Inspection ("DPI") methods for extracting various kinds of information from a data packet are known in the art, and therefore will not be described here in detail. Any known or to be known DPI method can be employed in block 404 without limitation. However, it should be noted that such DPI methods typically involve inspection of layer 2 and beyond layer 3 of the standard Open Systems Interconnection ("OSI") model. In some cases, DPI methods invoked in accordance with the present solution discussed herein can look through layers 2-7 of the OSI model. This inspection can include headers and data protocol structures as well as the payload of the message. The DIP process will thereafter identify and classify data traffic based on a database of packet signatures which associate certain data characteristics with defined data types and/or software applications which use such data types. For example, the data packets may be determined to comprise video data, VOIP data, FTP data, and/or data supporting a virtual desktop session. Headers of a data packet may provide forwarding information for the data packet. The optimal data transmission requirements can vary depending on the particular data type. Accordingly, the type of data that is being communicated as determined at 404 can be used in a subsequent block 408 for selecting a particular route through which such data will be communicated.

Upon completing 404, method 400 continues to 406 that involves determining, by the middlebox node, K shortest paths to a destination node (e.g., node 102 of FIG. 1) for the data packet. As discussed above, each middlebox node stores information regarding network topology of the overlay network, and hence, has knowledge about characteristics of the other middlebox nodes and the links established there between. The middlebox node then runs a K-shortest path routing algorithm (such as Yen's algorithm) to find the K shortest paths to the destination node in non-decreasing order of cost. K is an integer value representing a number of shortest paths. The problem can be restricted to have the K shortest path without loops (where loops are removed) if there are duplicate entries.

In some scenarios, the middlebox node may periodically (such as every few minutes) determine K shortest paths to all the other nodes in an overlay network, and store the information in an internal or external memory. The K shortest path information may be stored in any format selected in accordance with a particular application. The K shortest path information may also be used to produce a routing table. The middlebox node may then access the memory and/or routing table to extract the K shortest paths to a destination node when a data packet is received. Alternatively and/or additionally, the middlebox node may: only store and periodically update network topology information; and determine the K shortest paths to the destination node using the stored network topology in response to receiving a data packet. The maximum number of hops in the K shortest paths may be pre-defined. For example, a network administrator may provide that the K shortest paths may not have more than 2, 3, 4, 5, . . . , or N number of hops, where N in an integer.

Referring back to FIG. 2, assume that middlebox node 108a receives data packets from first computer network 104-1, and that the address information contained in the data packets indicate that the data packets are to be communicated to a computer device (not shown) in the second computer network 104-2. The data packet may traverse the following virtual paths: (i) 108a-108c-108d, (ii) 108a-108b-108d, (iii) 108a-108b-108c-108d, (iv) 108a-108c-108b-108d, and (v) 108a-108d. If the number of maximum hops for the K shortest paths is set to have a value of one (1), the middlebox node 108a will only include the following virtual paths in the K shortest paths: (i) 108a-108c-108d, (ii) 108a-108b-108d, and (v) 108a-108d.

After the K shortest paths have been identified the middlebox node collects or receives 408 dynamic information relating to the identified K shortest paths. The dynamic information can include, but is not limited to, data latency associated with links between nodes of a path, data loss characteristics associated with links between nodes of a path, jitter corresponding to links between nodes of a path, and path metrics relating to each of the paths (e.g., available bandwidth, overall latency, link quality, and lease time).

Figure 5:
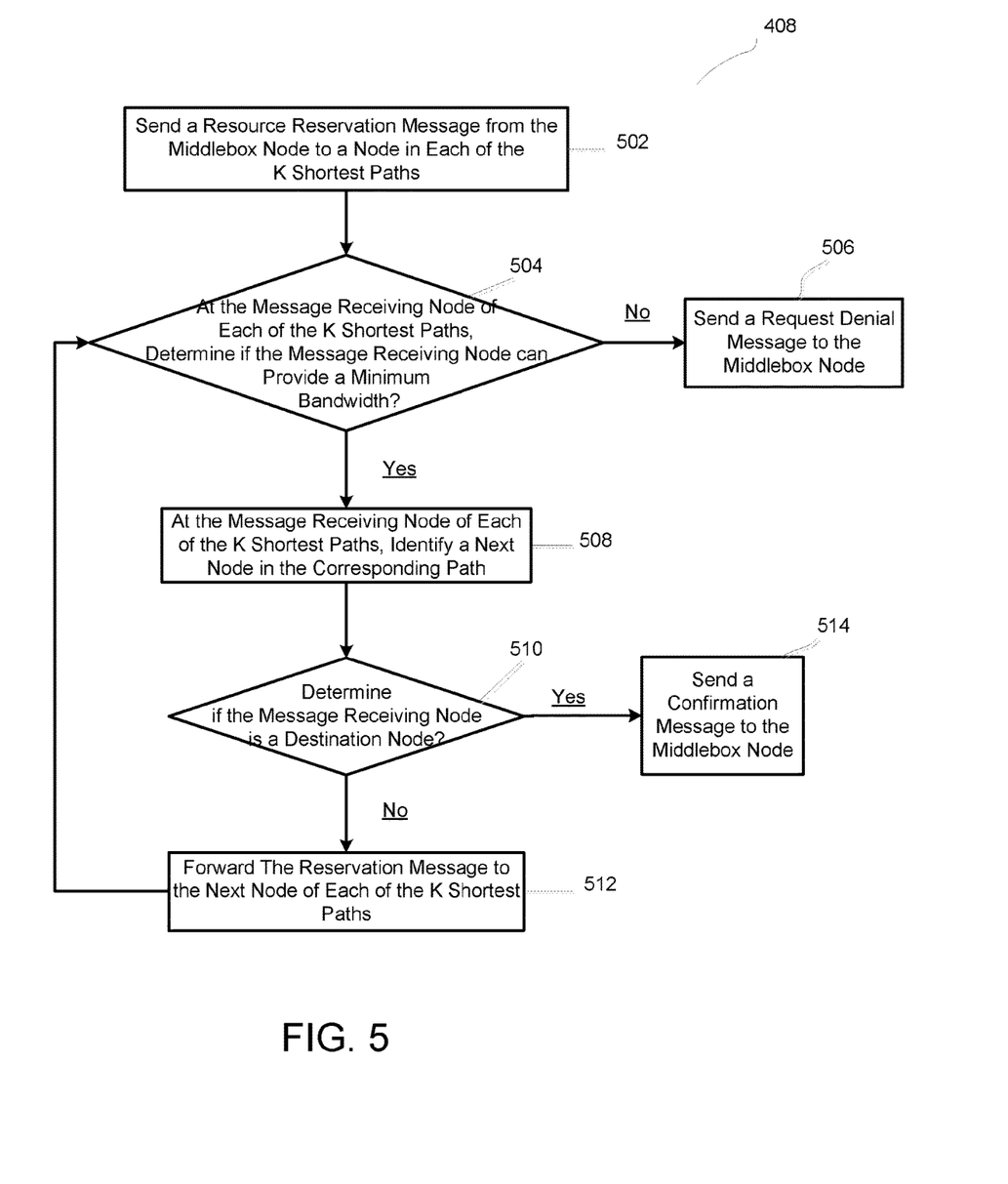
FIG. 5 is a flowchart that is useful for understanding how information relating to K shortest paths is dynamically collected by a middlebox.

FIG. 5 illustrates a flowchart for an example routing algorithm 500 for collecting or receiving information relating to the K shortest paths. As shown in FIG. 5, algorithm 500 begins at 502 where the middlebox node sends a resource reservation message to a first node (i.e., a node adjacent to the middlebox node) in each of the K shortest paths. A resource reservation message comprises first information relating to the bandwidth needed for transmission of a data packet and second information relating to the corresponding path (of the K shortest determined paths). For example, if the K shortest paths in the overlay network (between middlebox node 108a and a destination node in second computer network 104-2) are identified as (i) 108a-108c-108d, (ii) 108a-108b-108d, and (ii) 108a-108d, the middlebox node 108a can send: a resource reservation message to middlebox node 108c including the bandwidth required and information relating to the path 108a-108c-108d; a resource reservation message to middlebox node 108*b* including the bandwidth required and information relating to the path 108*a*-108*b*-108*d*; and a resource reservation message to middlebox node 108*d* including the bandwidth required and information relating to the path 108*a*-108*d*.

Upon receipt of the resource reservation messages, at 504 the middlebox node (e.g., middlebox nodes 108*b*, 108*c*, 108*d* of FIGS. 1-2) checks if it can provide the requested bandwidth to the requesting middlebox node (e.g., middlebox node 108*a* of FIGS. 1-2. If a middlebox node (e.g., middlebox nodes 108*b*, 108*c* or 108*d* of FIGS. 1-2) cannot provide the requested bandwidth to the requesting middlebox [504: NO], then the middlebox node (e.g., middlebox nodes 108*b*, 108*c* or 108*d* of FIGS. 1-2) sends 506 a resource denial message to the requesting middlebox node (e.g., middlebox node 108*a* of FIGS. 1-2). However, if the middlebox node (e.g., middlebox nodes 108*b*, 108*c* or 108*d* of FIGS. 1-2) can provide the requested bandwidth [504: YES], the middlebox node may identify 508 the next middlebox node in the corresponding path using the information relating to the path included in the resource reservation message.

At 510 it is determined if the middlebox node (e.g., middlebox nodes 108*b*, 108*c* or 108*d* of FIGS. 1-2) is a destination node. If the middlebox node is a destination node [510: YES], then a confirmation message 514 is sent to the requesting middlebox node (e.g., middlebox node 108*a* of FIGS. 1-2). The confirmation message may include all the information received by the destination middlebox node in the reservation message, additional information added to the reservation message by the destination node (such as a lease time, latency information, and/or link characteristics), as well as a confirmation of reservation of resources on the corresponding path.

If the middlebox node is not a destination node [510: NO], then the resource reservation message is forwarded 512 to the next middlebox node in the given path. Additional information may be included in and/or added to the resource reservation message prior to being forwarded to the next middlebox node. This additional information includes, but is not limited to, a lease time for the node, latency information, and/or link characteristics. As used herein, lease time corresponds to the amount of time a node may dedicate the requested bandwidth to the data packet of the requesting middlebox node.

As discussed above, each of the nodes in an overlay network may be connected via one or more links. The latency and link characteristics may correspond to the link (of the one or more links) between the requesting middlebox node and the next middlebox node in a given path that satisfies the bandwidth requirement. If a plurality of links between the requesting middlebox and the next middlebox node satisfy the bandwidth requirement, one or more rules (as discussed above) may be used to identify the best quality link. The latency and link characteristics corresponding to the identified best quality link may be included in the forwarded resource reservation message. For example, various characteristics such as data latency associated with the particular link, data loss characteristics associated with the particular link and jitter corresponding to the particular link may be analyzed in accordance with the rules. In such a routing algorithm, different characteristics can be accorded different weights in accordance with the type of data which is being communicated. Consequently, the routing algorithm can select a link for an incoming data packet which is optimal for that data packet type. The exact nature of the algorithm can vary, but it should be arranged to utilize the additional available link characteristic information to choose an optimal path for each data type.

Method 500 continues until the reservation message reaches the destination middlebox node or a request denied message is sent to the requesting middlebox node from any of the intermediate middlebox nodes on a given path. In this regard, method 500 returns to block 504 upon completing 512.

Referring again to FIG. 4, method 400 continues to block 410. The middlebox node uses the collected information to determine 410 an optimal routing path for path between the middlebox nodes (e.g., middlebox node 108*a*, 108*b*, 108*c* of FIGS. 1-2) comprising the overlay network to a destination middlebox node (e.g., middlebox node 108*d* of FIGS. 1-2). As discussed above, for each of the K shortest paths, the middlebox node (e.g., middlebox node 108*a* of FIGS. 1-2) can receive a confirmation message or a request denial message. The middlebox node (e.g., middlebox node 108*a* of FIGS. 1-2) can discard the paths for which a request denial message was received. Additionally, the middlebox node (e.g., middlebox node 108*a* of FIGS. 1-2) may store the corresponding information in an internal or external memory for future use. For example, in identifying K shortest paths for future data packets, the middlebox node (e.g., middlebox node 108*a* of FIGS. 1-2) considers that some of the other middlebox nodes (e.g., middlebox node 108*b*, 108*c*, 108*d* of FIGS. 1-2) in the overlay network may not be able to provide a desired link characteristic or bandwidth.

In some scenarios, for the subset of the K shortest paths for which a confirmation message was received, the middlebox node (e.g., middlebox node 108*a* of FIGS. 1-2) may use several factors to select an optimal routing path. Factors which may be considered for this purpose can include, but are not limited to, vector distance such as shortest path (as per conventional routing methods) and/or other factors which are useful for selecting an optimal path based on the type of data being communicated as well as link characteristics for a path included in the corresponding confirmation message. For each path in the subset of the K shortest paths, the middlebox node may determine overall path metrics using one or more rules. For example, the middelbox node determines an overall lease time corresponding to the minimum lease time of the nodes in the path, an overall latency as the sum of all the latency in the intermediate links in the path, and an overall link quality corresponding to the minimum link quality of all the intermediate links in the path. Other rules for determining the overall path metrics for a path are within the scope of this disclosure.

The determined overall path metrics are then used to select an optimal routing path for forwarding the data packet to the destination node. Different metrics can be accorded different weights in accordance with the type of data which is being communicated. Consequently, a path can be selected for an incoming data packet which is optimal for that data packet type.

The exact nature of the optimal path identification algorithm employed by the middlebox node (e.g., middlebox node 108*a* of FIGS. 1-2) can vary, but it should be arranged to utilize the additional available path attribute information to choose an optimal path for each data type. For example, a route algorithm evaluating how optimal to route packets associated with VOIP communications might primarily consider a metric specifying total jitter over a particular route. In contrast, if the route algorithm is routing packets associated with a virtual desktop application then it might instead use total latency as a primary consideration when selecting an optimal route. So, the route selection can be customized to the type of application which generated the data packet.

Once the particular route has been selected, the data packet is transmitted 412 to the next hop along a chosen optimal route. In decision block 414, a decision is made as to whether a routing update action is needed. If no routing update action is required [414: NO], method 400 returns to 402 to process the next data packet for routing purposes. However, if a routing update is required [414: YES], then method 400 returns to step 406. Routing update actions can be performed on a periodic basis, and/or when a change is detected in existing routes. For example, a change can involve a route which is no longer available, or a route for which lease time corresponding to one or more nodes has expired. Alternatively, the change can be a detected change in one of the route attributes (e.g., available bandwidth, latency, packet loss and/or jitter).

A decision can also be made in decision block 416 as to whether method 400 has been terminated. For example the method 400 may be terminated when If so [416: YES], then method 400 continues with step 418 where it ends or other processing is performed. Otherwise [416: NO], method 400 returns to step 402 and begins processing the next incoming data packet.

In FIG. 5, levels of significance or weight accorded to each of the plurality of route attributes within the routing algorithm are advantageously based on the type of data contained in the data packet. As will be appreciated, the type of data packet implies a type of software application which communicated said data packet, and the routing algorithm selects in step 508 of FIG. 5 the optimal route to facilitate optimal performance of the type of application which is implied. So, the amount of weigh or significance accorded by the algorithm to each of the route attributes when selecting a route can be selectively varied based on the data type and/or application type. Optimal performance for a particular application using the communication service is obtained by more heavily weighting within the routing algorithm the importance or significance of one or more attributes from among the plurality of attributes. The more heavily weighted attributes are those which are predetermined to be of special important for that application type or data type for purposes of selecting the optimal route from among the plurality of routes.

With the foregoing arrangement, an optimal route which is chosen can vary or change at step 410 of FIG. 4 for a subsequently received data packet which is of the same type as an earlier data packet which has been communicated. For example, the optimal route selection can change when a change occurs in one or more of the plurality of routes with respect to one or more of the route metrics which are predetermined to be of importance for communicating the type of data under consideration.

As discussed above, the middlebox nodes described herein can comprise a computer networking device (e.g. a network appliance) comprised of one or more components such as a processor, an application specific circuit, a programmable logic device, a digital signal processor, or other circuit programmed to perform the functions described herein. The present solution can be realized in one computer system or several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein.

The present solution disclosed herein can be realized in one computer system or several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein. A computer system as referenced herein can comprise various types of computing systems and devices, including a server computer, a Personal Computer ("PC"), a laptop computer, a desktop computer, a network router, switch or bridge, or any other device capable of executing a set of instructions (sequential or otherwise) that specifies actions to be taken by that device.

Figure 6:
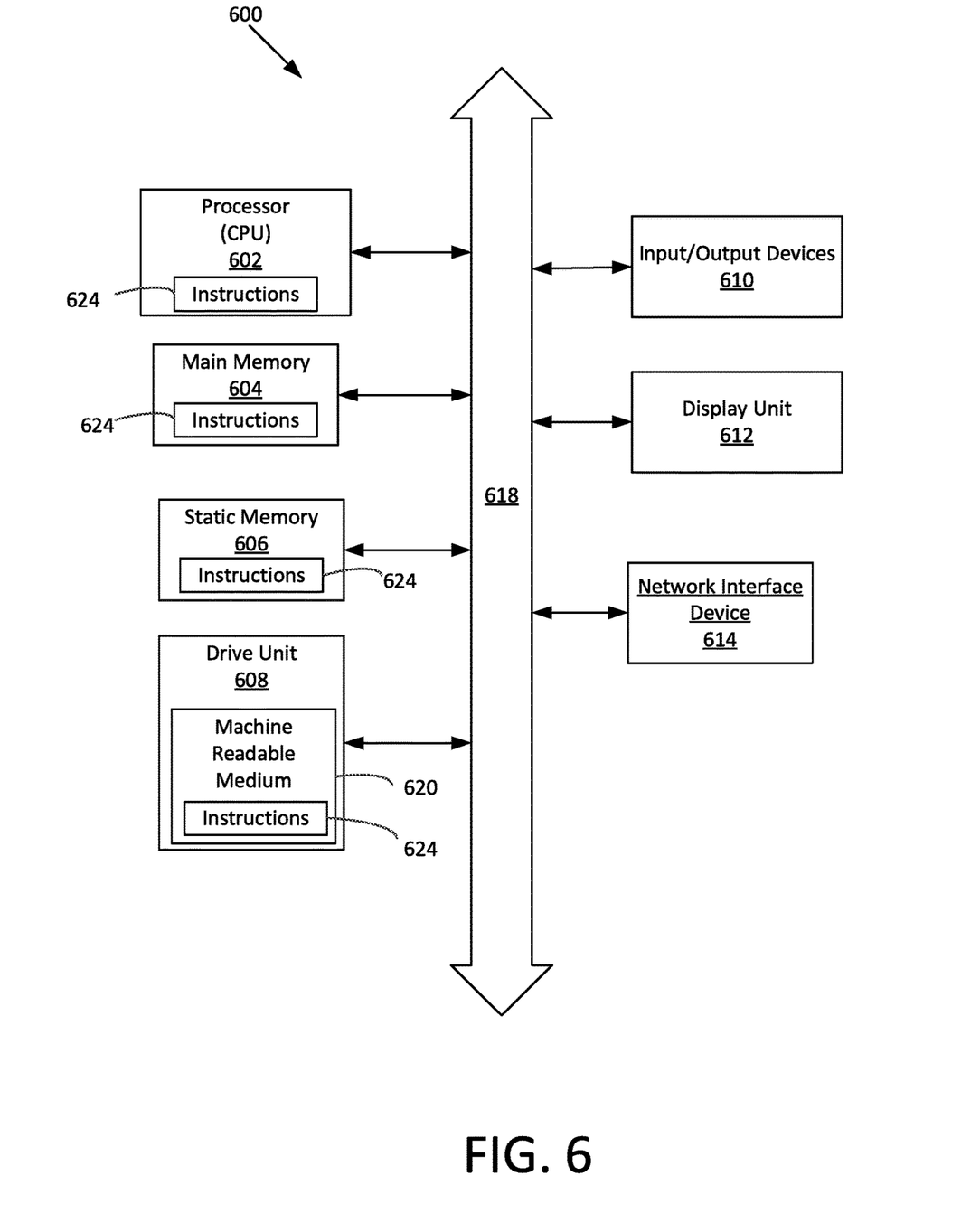
FIG. 6 is a block diagram of an exemplary computer system that can perform processing operations as described herein for purposes of implementing an overlay network.

Referring now to FIG. 6, there is shown a hardware block diagram comprising an exemplary computer system 600. The machine can include a set of instructions which are used to cause the computer system to perform any one or more of the methodologies discussed herein. In a networked deployment, the machine can function as a server or a router. In one or more scenarios, the exemplary computer system 600 can correspond to each of the middlebox nodes 108a, 108b, 108c, 108d of FIGS. 1-2.

The computer system 600 can operate independently as a standalone device. However, the present solution is not limited in this regard and in other scenarios the computer system can be operatively connected (networked) to other machines in a distributed environment to facilitate certain operations described herein. Accordingly, while only a single machine is illustrated in FIG. 6, it should be understood that the present solution can be taken to involve any collection of machines that individually or jointly execute one or more sets of instructions as described herein.

The computer system 600 is comprised of a processor 602 (e.g., a Central Processing Unit ("CPU")), a main memory 604, a static memory 606, a drive unit 608 for mass data storage and comprised of machine readable media 620, input/output devices 610, a display unit 612 (e.g., a Liquid Crystal Display ("LCD"), a solid state display, or a Cathode Ray Tube ("CRT")), and a network interface device 614. Communications among these various components can be facilitated by means of a data bus 618. One or more sets of instructions 624 can be stored completely or partially in one or more of the main memory 604, static memory 606, and drive unit 608. The instructions can also reside within the processor 602 during execution thereof by the computer system. The input/output devices 610 can include a keyboard, a mouse, a multi-touch surface (e.g., a touchscreen) and so on. The network interface device 614 can be comprised of hardware components and software or firmware to facilitate wired or wireless network data communications in accordance with a network communication protocol utilized by a data network (e.g., packet data network 100 of FIG. 1 and/or packet data network 200 of FIG. 2).

The drive unit 608 can comprise a machine readable medium 620 on which is stored one or more sets of instructions 624 (e.g., software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include magnetic media, solid-state memories, optical-media and so on. More particularly, tangible media as described herein can include; magnetic disks; magneto-optical disks; CD-ROM disks and DVD-ROM disks, semiconductor memory devices, Electrically Erasable Programmable Read-Only Memory ("EEPROM")) and flash memory devices. A tangible medium as described herein is one that is non-transitory insofar as it does not involve a propagating signal.

Computer system 600 should be understood to be one possible example of a computer system which can be used in connection with the various embodiments. However, the present solution is not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

Further, it should be understood that the present solution can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout the specification may, but do not necessarily, refer to the same embodiment.

Furthermore, the described features, advantages and characteristics disclosed herein may be combined in any suitable manner in one or more embodiments. One skilled in the relevant art will recognize, in light of the description herein, that the embodiments can be practiced without one or more of the specific features or advantages of a particular embodiment. In other instances, additional features and advantages may be recognized in certain embodiments that may not be present in all embodiments.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the embodiments have been illustrated and described with respect to one or more implementations, equivalent alterations and modifications will occur to others skilled in the art upon the reading and understanding of this specification and the annexed drawings. In addition, while a particular feature of an embodiment may have been disclosed with respect to only one of several implementations, such feature may be combined with one or more other features of the other implementations as may be desired and advantageous for any given or particular application. Thus, the breadth and scope of the embodiments disclosed herein should not be limited by any of the above described embodiments. Rather, the scope of the invention should be defined in accordance with the following claims and their equivalents.

I claim:

1. A method for routing packet data through an overlay network based on application needs and network conditions, comprising:
   receiving, at a computer networking device connected to a first computer network, a data packet to be communicated to a destination computing device;
   analyzing, by the computer networking device, the data packet to determine:
      a minimum bandwidth requirement corresponding to the data packet, and
      the destination computing device connected to a second computer network;
   dynamically identifying a plurality of paths between the computer networking device and the destination computing device, wherein each of the plurality of paths traverse one or more peer nodes;
   using the minimum bandwidth requirement to obtain at the computer networking device, path information for each of the plurality of paths, the path information comprising a plurality of path metrics specifying dynamic characteristics for each of the plurality of paths; and
   choosing an optimal path to the destination computing device from among the plurality of paths based on the plurality of path metrics associated with each of the plurality of paths;
   wherein the computer networking device and a plurality of peer nodes comprise the second computer network which is an overlay upon the first computer network;
   wherein the plurality of paths traverse paths that include network nodes other than the plurality of peer nodes; and
   wherein each of the plurality of path metrics has accorded thereto at least one level of significance or weight that is selectively variable based on a type of data contained in the data packet.

2. The method according to claim 1, wherein the plurality of path metrics comprise at least one of data latency associated with the particular path, lease time associated with the particular path, and link quality associated with the particular path.

3. The method according to claim 1, further comprising:
   determining a type of data contained in the data packet; and
   selectively varying the at least one level of significance or weight accorded to each of the plurality of path metrics based on the type of data contained in the data packet for purposes of choosing the optimal path to the destination computing device.

4. The method according to claim 3, wherein the type of data packet implies a type of application which communicated the data packet, and the optimal path is chosen to facilitate optimal performance of the type of application which is implied.

5. The method according to claim 4, wherein the optimal performance is obtained by more heavily weighting importance associated with one or more metrics from among the plurality of path metrics for purposes of choosing the optimal path to the destination computing device from among the plurality of paths.

6. The method according to claim 3, further comprising selectively varying an optimal path which is chosen for a subsequently received second data packet which is of the same type as the at least one data packet.

7. The method according to claim 6, wherein the optimal path is varied when a change occurs in one or more of the plurality of paths with respect to one or more of the path metrics which are predetermined to be of importance for communicating the type of data.

8. A method for routing packet data through an overlay network based on application needs and network conditions, comprising:
   receiving, at a computer networking device connected to a first computer network, a data packet to be communicated to a destination computing device;
   analyzing, by the computer networking device, the data packet to determine:
      a minimum bandwidth requirement corresponding to the data packet, and
      the destination computing device connected to a second computer network;
   dynamically identifying a plurality of paths between the computer networking device and the destination computing device, wherein each of the plurality of paths traverse one or more peer nodes;
   using the minimum bandwidth requirement to obtain at the computer networking device, path information for each of the plurality of paths, the path information comprising a plurality of path metrics specifying dynamic characteristics for each of the plurality of paths; and
   choosing an optimal path to the destination computing device from among the plurality of paths based on the plurality of path metrics associated with each of the plurality of paths;
   wherein the computer networking device and a plurality of peer nodes comprise the second computer network which is an overlay upon the first computer network;
   wherein the plurality of paths traverse paths that include network nodes other than the plurality of peer nodes; and
   wherein said using comprises, for each of the plurality of paths sending a reservation message to a peer node adjacent to the computer networking device in that path, wherein the reservation message comprises:
      the minimum bandwidth requirement;
      information relating to subsequent peer nodes in that path; and
      instructions for each peer node in that path to, upon receipt of a reservation message, perform the following:
         determine whether that peer node can fulfill the minimum bandwidth requirement, and
         if that peer node cannot fulfill the minimum bandwidth requirement, send a request denial message to the computer networking device.

9. The method according to claim 8, wherein the reservation message further comprises instructions for each peer node in the path to, if that peer node can fulfill the minimum bandwidth requirement:
   update the reservation message to include in the reservation message information relating to at least one of: a lease time associated with that peer node, a latency associated with a link between that peer node and a peer node from which the reservation message was received, and a link quality associated with the link;
   determine whether that peer node is the destination computing device;
   if that peer node is the destination computing device, send a confirmation message to the computer networking device, the confirmation message comprising the updated reservation message; and
   if the peer node is not the destination computing device, forward the updated reservation message to a next peer node in the path.

10. The method according to claim 9, further comprising: upon receipt of a confirmation message corresponding to a path, at the computer networking device, using information included in the confirmation message to determine the plurality of path metrics for the path.

11. The method according to claim 10, wherein the plurality of path metrics are determined based on:
   a data latency associated with the path, the data latency being a sum of a plurality of data latencies associated with a plurality of links in the path;
   a lease time associated with the path, the lease time corresponding to a minimum lease times of a plurality lease times associated with the plurality of links in the path; or
   link quality associated with the particular path, the link quality corresponding to a minimum link quality of a plurality link qualities associated with the plurality of links in the path.

12. The method according to claim 8, further comprising: upon receipt of a request denial message corresponding to a path, at the computer networking device, discarding the path.

13. The method according to claim 12, further comprising storing, at the computer networking device, route information for the discarded path, including the plurality of route metrics for the discarded path.

14. The method according to claim 8, wherein the reservation message further comprises instructions for each peer node in the path to, if that peer node can fulfill the minimum bandwidth requirement: identify an optimal link, of a plurality of links, between that peer node and a peer node from which the reservation message was received based on one or more link characteristics associated with each of the plurality of links, the one or more link characteristics selected from the group consisting of the available bandwidth, data latency, data loss characteristics, and jitter.

15. The method according to claim 14, wherein information concerning the one or more link characteristics for each of the plurality of links is determined based on data traffic communicated between that peer node and the peer node from which the reservation message was received.

16. A network appliance for routing packet data through an overlay network, comprising:
a computer networking device including at least one processing circuit and configured to:
receive, from a first computer network, a data packet to be communicated to a destination computing device,
analyze the data packet to determine:
a minimum bandwidth requirement corresponding to the data packet, and
the destination computing device connected to a second computer network,
dynamically identify a plurality of paths between the computer networking device and the destination computing device, wherein each of the plurality of paths traverse one or more peer nodes,
use the minimum bandwidth requirement to obtain path information for each of the plurality of paths, the path information comprising a plurality of path metrics specifying dynamic characteristics for each of the plurality of paths, and
choose an optimal path to the destination computing device from among the plurality of paths based on the plurality of path metrics associated with each of the plurality of paths;
wherein the computer networking device and a plurality of peer nodes comprise the second computer network which is an overlay upon the first computer network;
wherein the plurality of paths traverse paths through network nodes other than the peer nodes; and
wherein each of the plurality of path metrics has accorded thereto at least one level of significance or weight that is selectively variable based on a type of data contained in the data packet.

17. The network appliance according to claim 16, wherein the plurality of path metrics comprise at least one of data latency associated with the particular path, lease time associated with the particular path, and link quality associated with the particular path.

18. The network appliance according to claim 16, further comprising:
determining a type of data contained in the data packet; and
selectively varying the at least one level of significance or weight accorded to each of the plurality of path metrics based on the type of data contained in the data packet for purposes of choosing the optimal path to the destination computing device.

19. The network appliance according to claim 18, wherein the type of data packet implies a type of application which communicated the data packet, and the optimal path is chosen to facilitate optimal performance of the type of application which is implied.

20. The network appliance according to claim 19, wherein the optimal performance is obtained by more heavily weighting importance associated with one or more metrics from among the plurality of path metrics for purposes of choosing the optimal path to the destination computing device from among the plurality of paths.

21. The network appliance according to claim 18, further comprising selectively varying an optimal path which is chosen for a subsequently received second data packet which is of the same type as the at least one data packet.

22. The network appliance according to claim 21, wherein the optimal path is varied when a change occurs in one or more of the plurality of paths with respect to one or more of the path metrics which are predetermined to be of importance for communicating the type of data.

23. A network appliance for routing packet data through an overlay network, comprising:
a computer networking device including at least one processing circuit and configured to:
receive, from a first computer network, a data packet to be communicated to a destination computing device,
analyze the data packet to determine:
a minimum bandwidth requirement corresponding to the data packet, and
the destination computing device connected to a second computer network,
dynamically identify a plurality of paths between the computer networking device and the destination computing device, wherein each of the plurality of paths traverse one or more peer nodes,
use the minimum bandwidth requirement to obtain path information for each of the plurality of paths, the path information comprising a plurality of path metrics specifying dynamic characteristics for each of the plurality of paths, and
choose an optimal path to the destination computing device from among the plurality of paths based on the plurality of path metrics associated with each of the plurality of paths;
wherein the computer networking device and a plurality of peer nodes comprise the second computer network which is an overlay upon the first computer network;
wherein the plurality of paths traverse paths through network nodes other than the peer nodes; and
wherein said using comprises, for each of the plurality of paths sending a reservation message to a peer node adjacent to the computer networking device in that path, wherein the reservation message comprises:
the minimum bandwidth requirement;
information relating to subsequent peer nodes in that path; and
instructions for each peer node in that path to, upon receipt of a reservation message, perform the following:
determine whether that peer node can fulfill the minimum bandwidth requirement, and
if that peer node cannot fulfill the minimum bandwidth requirement, send a request denial message to the computer networking device.

24. The network appliance according to claim 23, wherein the reservation message further comprises instructions for each peer node in the path to, if that peer node can fulfill the minimum bandwidth requirement:
update the reservation message to include in the reservation message information relating to at least one of: a lease time associated with that peer node, a latency associated with a link between that peer node and a peer node from which the reservation message was received, and a link quality associated with the link;
determine whether that peer node is the destination computing device;
if that peer node is the destination computing device, send a confirmation message to the computer networking device, the confirmation message comprising the updated reservation message; and
if the peer node is not the destination computing device, forward the updated reservation message to a next peer node in the path.

25. The network appliance according to claim 24, wherein the computer networking device is further configured to: upon receipt of a confirmation message corresponding to a path, use information included in the confirmation message to determine the plurality of path metrics for the path.

26. The network appliance according to claim 25, wherein the plurality of path metrics are determined based on:
- a data latency associated with the path, the data latency being a sum of a plurality of data latencies associated with a plurality of links in the path;
- a lease time associated with the path, the lease time corresponding to a minimum lease times of a plurality lease times associated with the plurality of links in the path; or
- link quality associated with the particular path, the link quality corresponding to a minimum link quality of a plurality of link qualities associated with the plurality of links in the path.

27. The network appliance according to claim 23, wherein the computer networking device is further configured to: upon receipt of a request denial message corresponding to a path, discard the path.

28. The network appliance according to claim 27, wherein the computer networking device is further configured to: store route information for the discarded path, including the plurality of route metrics for the discarded path.

29. The network appliance according to claim 23, wherein the reservation message further comprises instructions for each peer node in the path to, if that peer node can fulfill the minimum bandwidth requirement: identify an optimal link, of a plurality of links, between that peer node and a peer node from which the reservation message was received based on one or more link characteristics associated with each of the plurality of links, the one or more link characteristics selected from the group consisting of the available bandwidth, data latency, data loss characteristics, and jitter.

30. The network appliance according to claim 29, wherein information concerning the one or more link characteristics for each of the plurality of links is determined based on data traffic communicated between that peer node and the peer node from which the reservation message was received.

* * * * *